US011327211B2

(12) United States Patent
Song et al.

(10) Patent No.: US 11,327,211 B2
(45) Date of Patent: May 10, 2022

(54) ASYMMETRIC TRANSMISSION FILM

(71) Applicant: LG Chem, Ltd., Seoul (KR)

(72) Inventors: Jin Suk Song, Daejeon (KR); Sang Choll Han, Daejeon (KR); Sung Hak Bae, Daejeon (KR); Byung Mook Kim, Daejeon (KR); Bum Woo Lee, Daejeon (KR)

(73) Assignee: LG Chem, Ltd.

( * ) Notice: Subject to any disclaimer, the term of this patent is extended or adjusted under 35 U.S.C. 154(b) by 494 days.

(21) Appl. No.: 16/484,636

(22) PCT Filed: Jan. 26, 2018

(86) PCT No.: PCT/KR2018/001157
§ 371 (c)(1),
(2) Date: Aug. 8, 2019

(87) PCT Pub. No.: WO2018/147580
PCT Pub. Date: Aug. 16, 2018

(65) Prior Publication Data
US 2019/0353835 A1 Nov. 21, 2019

(30) Foreign Application Priority Data
Feb. 10, 2017 (KR) .................. 10-2017-0018632

(51) Int. Cl.
*G02B 5/22* (2006.01)
*G02B 1/04* (2006.01)
*G02B 5/30* (2006.01)
(52) U.S. Cl.
CPC .................. *G02B 5/22* (2013.01); *G02B 1/04* (2013.01); *G02B 5/30* (2013.01)

(58) Field of Classification Search
CPC ... G02B 5/22; G02B 1/04; G02B 5/30; G02B 27/142; G02B 5/003; G02B 5/206;
(Continued)

(56) References Cited

U.S. PATENT DOCUMENTS 4,683,348 A * 7/1987 Pidgeon ............. H01L 31/0547
136/246
4,792,685 A * 12/1988 Yamakawa ........... G01J 1/0407
250/353
(Continued)

FOREIGN PATENT DOCUMENTS

CN 1347208 A 5/2002
CN 1703644 A 11/2005
(Continued)

OTHER PUBLICATIONS

Chinese Search Report for Application No. 201880010049.1, dated Jan. 6, 2021, 11 pages.
(Continued)

*Primary Examiner* — Balram T Parbadia
(74) *Attorney, Agent, or Firm* — Lerner, David, Littenberg, Krumholz & Mentlik, LLP

(57) ABSTRACT

An asymmetric transmission film including a body having a first surface and a second surface opposite to the first surface and a transmittance control member disposed in the body such that a forward transmittance of light passing in a direction from the first surface toward the second surface and a reverse transmittance of light passing in a direction from the second surface toward the first surface are different from each other.

20 Claims, 5 Drawing Sheets

(58) Field of Classification Search
CPC .............. G02B 19/0028; G02B 17/061; G02B 5/3066; G02B 17/06; G02B 19/00
See application file for complete search history.

(56) References Cited

U.S. PATENT DOCUMENTS

| | | | |
|---|---|---|---|
| 6,445,496 B1 | 9/2002 | Presby et al. | |
| 8,389,851 B2* | 3/2013 | Chan | H01L 31/0547 136/246 |
| 8,730,432 B2 | 5/2014 | Wang et al. | |
| 2005/0046977 A1* | 3/2005 | Shifman | H01L 31/0521 359/853 |
| 2006/0109571 A1 | 5/2006 | Hubinois et al. | |
| 2006/0207650 A1* | 9/2006 | Winston | H01L 31/0547 136/259 |
| 2007/0085103 A1* | 4/2007 | Nishioka | H01L 33/507 257/E33.072 |
| 2007/0188876 A1* | 8/2007 | Hines | H01L 31/0543 359/642 |
| 2007/0256726 A1 | 11/2007 | Fork et al. | |
| 2008/0030993 A1* | 2/2008 | Narendran | G02B 19/0052 257/E33.071 |
| 2008/0291541 A1 | 11/2008 | Padiyath et al. | |
| 2010/0128351 A1 | 5/2010 | Epstein et al. | |
| 2010/0177495 A1* | 7/2010 | Van Oers | F21V 9/30 362/84 |
| 2012/0287511 A1* | 11/2012 | Dross | F21V 5/04 359/641 |
| 2013/0121016 A1 | 5/2013 | Kim et al. | |
| 2014/0071693 A1* | 3/2014 | Zhang | G02B 19/0028 362/327 |
| 2014/0112003 A1* | 4/2014 | Lacroix | G02B 19/0061 362/329 |
| 2015/0085334 A1 | 3/2015 | Joo | |
| 2015/0192257 A1* | 7/2015 | Javadian | G02B 19/0061 362/555 |
| 2015/0219820 A1* | 8/2015 | Stormberg | G02B 19/0028 362/607 |
| 2015/0316226 A1* | 11/2015 | Kumar | F21S 43/14 362/522 |
| 2016/0003997 A1 | 1/2016 | Ouderkirk | |
| 2016/0153640 A1* | 6/2016 | Iatan | F21V 13/04 362/311.06 |
| 2019/0154233 A1* | 5/2019 | Broughton | G02B 19/0028 |

FOREIGN PATENT DOCUMENTS

| | | |
|---|---|---|
| CN | 101098112 A | 1/2008 |
| CN | 101432887 A | 5/2009 |
| CN | 201875954 U | 6/2011 |
| CN | 201937511 U | 8/2011 |
| JP | 4815879 B2 | 11/2011 |
| JP | 2016206434 A | 12/2016 |
| KR | 20090116670 A | 11/2009 |
| KR | 20100018552 A | 2/2010 |
| KR | 20110086779 A | 8/2011 |
| KR | 20110087325 A | 8/2011 |
| KR | 20110113235 A | 10/2011 |
| KR | 20120008007 A | 1/2012 |
| KR | 20150117661 A | 10/2015 |
| WO | 2013109020 A1 | 7/2013 |

OTHER PUBLICATIONS

International Search Report dated Apr. 26, 2018 for PCT/KR2018/001157, 2 pages.

* cited by examiner

[Figure 1a]
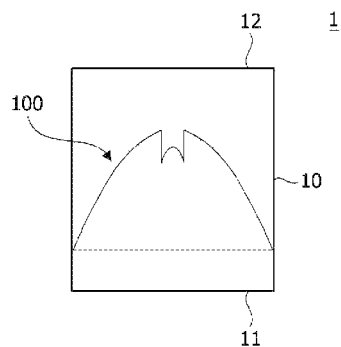
[Figure 1b]
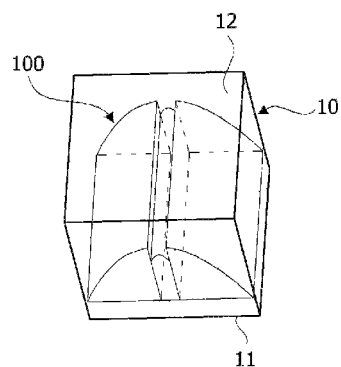
[Figure 2a]
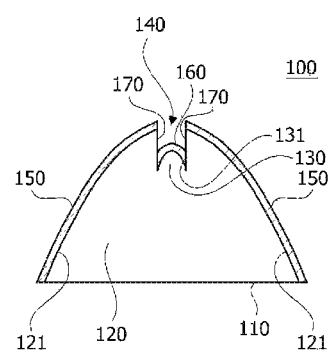

[Figure 2b]
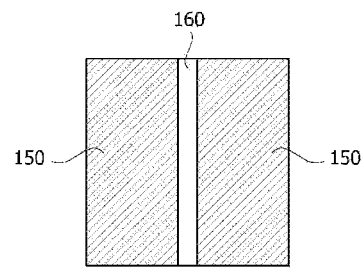
[Figure 3]
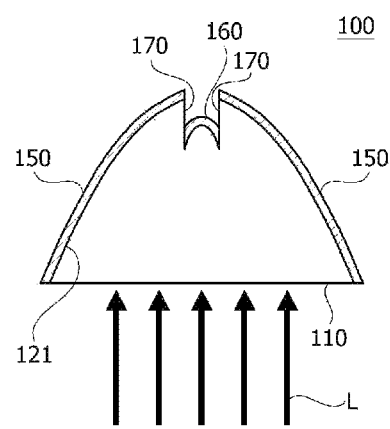
[Figure 4]
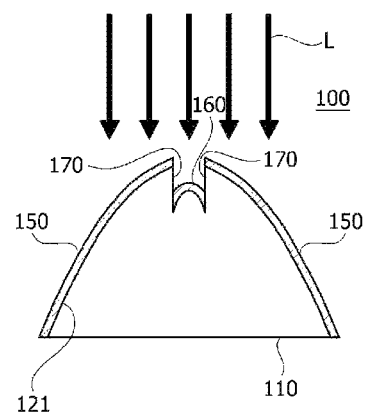

[Figure 5]
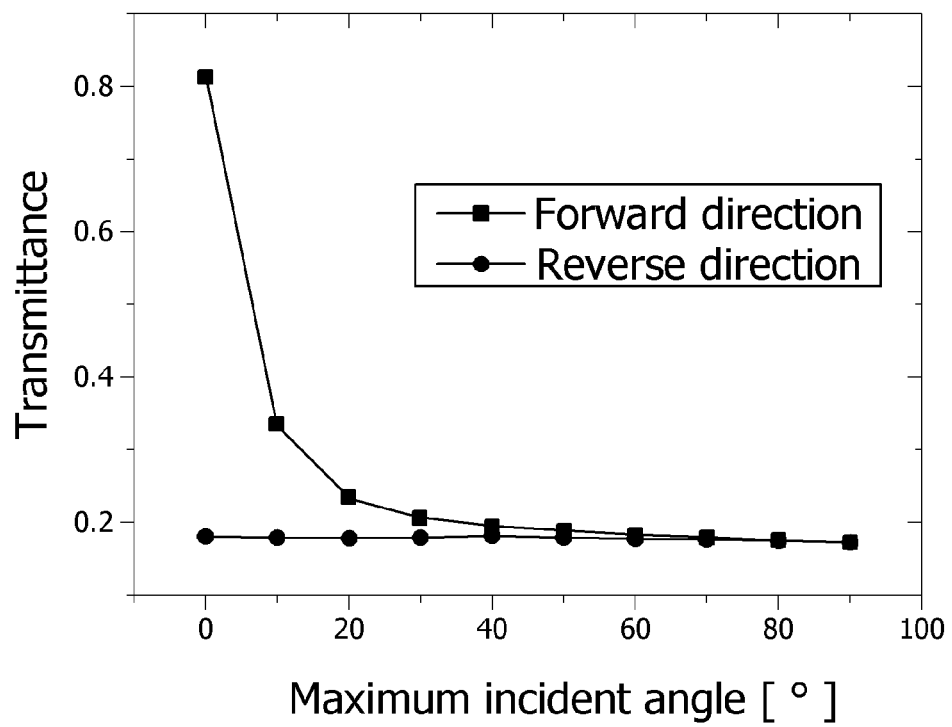

[Figure 6]
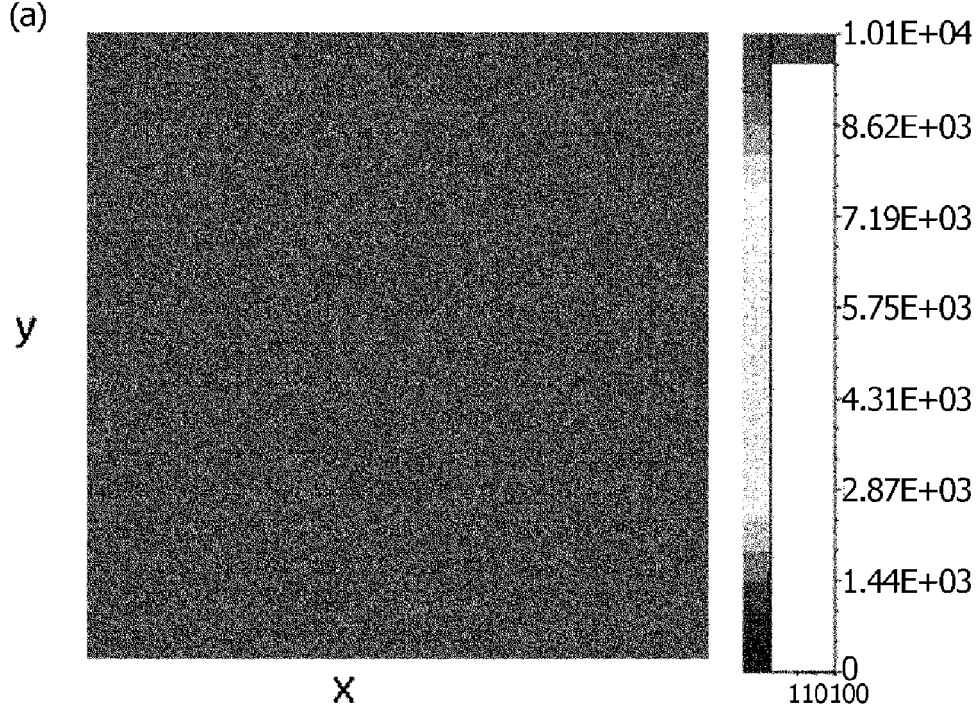
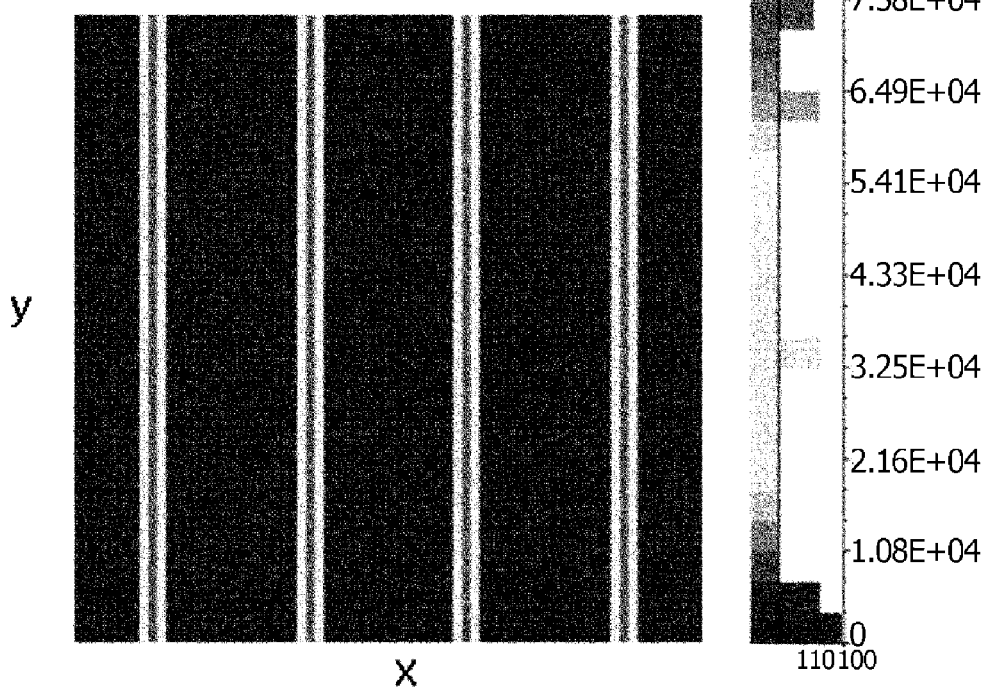

[Figure 7]
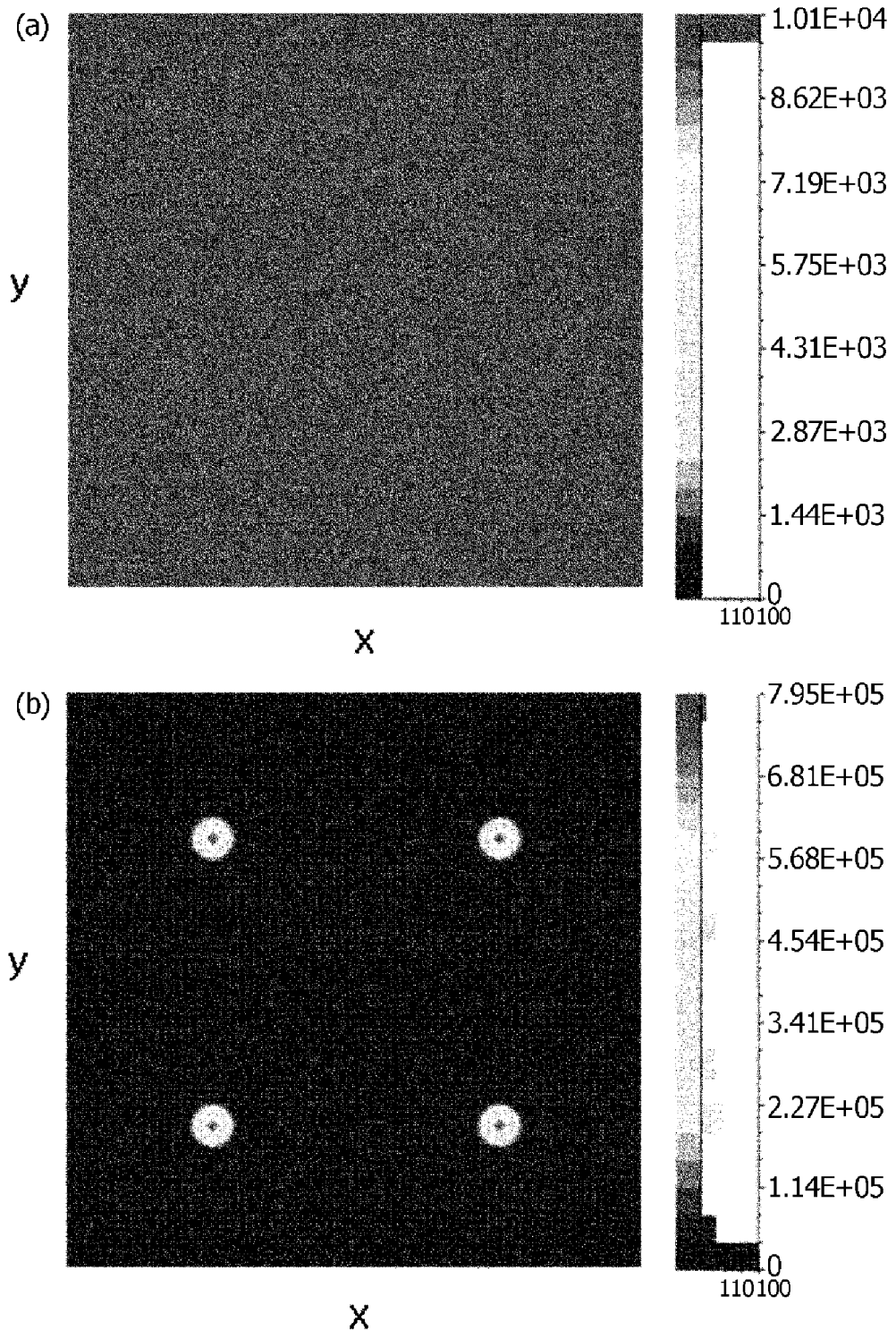

ASYMMETRIC TRANSMISSION FILM

CROSS-REFERENCE TO RELATED APPLICATIONS

The present application is a national phase entry under 35 U.S.C. § 371 of International Application No. PCT/KR2018/001157 filed Jan. 26, 2018, which claims priority from Korean Patent Application No. 10-2017-0018632 filed on Feb. 10, 2017, the disclosures of which are incorporated herein by reference.

TECHNICAL FIELD

The present invention relates to an asymmetric transmission film having different forward transmittance and reverse transmittance.

BACKGROUND ART

As a conventional asymmetric transmission film having different forward transmittance and reverse transmittance is composed of a film that operates at a specific wavelength, a specific incident angle and a specific polarization using a diffraction grating, liquid crystals, or the like, there is a problem that its function is remarkably deteriorated for various wavelengths, various incident angles and various polarizations.

In addition, there is a problem that it is difficult to manufacture a conventional asymmetric transmission film as a large-area film.

In order to use an asymmetric transmission film practically for natural light, the above problems must be overcome.

DISCLOSURE

Technical Problem

It is a problem to be solved by the present invention to provide an asymmetric transmission film having asymmetric bidirectional transmittance at various wavelengths and various incident angles.

In addition, it is another problem to be solved by the present invention to provide an asymmetric transmission film having asymmetric bidirectional transmittance regardless of the polarization of incident light.

Technical Solution

To solve the above-described problems, according to one aspect of the present invention, there is provided an asymmetric transmission film comprising a body having a first surface and a second surface opposite to the first surface and a transmittance control member disposed in the body such that a forward transmittance of light passing in a direction from the first surface toward the second surface and a reverse transmittance of light passing in a direction from the second surface toward the first surface are different from each other.

Also, the transmittance control member comprises a base part disposed so as to face the first surface of the body, a first curved surface part convexly arranged from the base part toward the second surface of the body, and a second curved surface part convexly arranged in the first curved surface part toward the second surface of the body, provided that at least one of a radius of the second curved surface part is different from a radius of the first curved surface part or a conic constant of the second curved surface part is different from a conic constant of the first curved surface part.

In addition, a reflective layer is provided on an outer circumferential surface of each of the first curved surface part and the second curved surface part.

Advantageous Effects

As described above, the asymmetric transmission film related to at least one embodiment of the present invention has the following effects.

Two curved surfaces forming reflective surfaces have different curved surface characteristics (for example, a radius, a conic constant), so that the bidirectional transmittance can have asymmetry at various wavelengths and various incident angles, and particularly, the bidirectional transmittance can have asymmetry regardless of the polarization of incident light.

Furthermore, by arranging the transmittance control member along a predetermined direction, it is easy to manufacture a large-area film.

BRIEF DESCRIPTION OF DRAWINGS

FIGS. 1a and 1b are views showing an asymmetric transmission film related to one embodiment of the present invention.

FIGS. 2a and 2b are views showing a transmittance control member constituting the asymmetric transmission film shown in FIGS. 1a and 1b.

FIGS. 3 and 4 are views for explaining one operating state (forward direction and reverse transmission) of the transmittance control member.

FIG. 5 is a graph comparing forward transmittance and reverse transmittance.

FIGS. 6 and 7 are calculation results showing illuminance changes by the asymmetric transmission film.

DETAILED DESCRIPTION OF THE DRAWINGS

Hereinafter, an asymmetric transmission film according to one embodiment of the present invention will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIGS. 1a and 1b are views showing an asymmetric transmission film related to one embodiment of the present invention, and FIGS. 2a and 2b are views showing a transmittance control member constituting the asymmetric transmission film shown in FIGS. 1a and 1b.

In addition, FIGS. 3 and 4 are views for explaining one operating state (forward direction and reverse transmission) of the transmittance control member, and FIG. 5 is a graph comparing forward transmittance and reverse transmittance.

Referring to FIGS. 1a and 1b, an asymmetric transmission film (1) related to one embodiment of the present invention comprises a body (10) and a transmittance control member (100).

The body (10) is a body of an optical film, which has a first surface (11) and a second surface (12) opposite to the first surface (11). Also, the body (10) is formed of a material having a predetermined transmittance and being capable of transmitting light at various wavelengths and various incident angles. The body (10) may be formed of a resin material, and for example, may be formed of a resin such as polyurethane acrylate (PUA), polyethylene terephthalate (PET), or polycarbonate (PC).

The transmittance control member (100) is disposed in the body (10) and a number of the transmittance control members (100) are arranged in the body (10) along a predetermined direction.

Also, the transmittance control member (100) is disposed in the body (10) such that the forward transmittance of the light (L) passing in the direction from the first surface (11) toward the second surface (12) (see, FIG. 3) and the reverse transmittance of the light (L) passing in the direction from the second surface (12) toward the first surface (11) are different from one another (see, FIG. 4).

Referring to FIGS. 2a and 2b, the transmittance control member (100) comprises a base part (110), a first protrusion (120) protruding from the base part (110) toward the second surface (12) convexly, a depression recessed toward the first surface (11) in the first protrusion (120) and a second protrusion (130) protruding from the depression toward the second surface (12) convexly. At this time, the first protrusion (120) and the second protrusion (130) may have a stepped structure by the depression, where the first protrusion (120) may further protrude toward the second surface of the body (10) than the second protrusion (130). At this time, the base part (110), the first protrusion (120) and the second protrusion (130) of the transmittance control member (100) may be formed of a resin material, and in particular, may be formed of the same resin material as the body (10).

Also, the second protrusion (130) may be located in a central region of the first protrusion (120). In particular, the first protrusion (120) may have a symmetrical shape on the basis of the second protrusion (130). At this time, the outer circumferential surface of the convexly protruding first protrusion (120) forms the first curved surface part (121) and the outer circumferential surface of the convexly protruding second protrusion (130) forms the second curved surface part (131). Both sidewalls (for example, constructed as a flat surface) of the depression (140) also constitute a connection (170) connecting the first curved surface part (121) and the second curved surface part (131).

Furthermore, the first curved surface part (121) and the second curved surface part (131) may be formed as a spherical surface or an aspherical surface including an ellipse, a parabola and a hyperbola, and the like. For example, each of the first curved surface part (121) and the second curved surface part (131) may be formed as an aspherical surface. In addition, the first curved surface part (121) and the second curved surface part (131) may have different curved surface characteristics. Specifically, in the first curved surface part (121) and the second curved surface part (131), at least one of a radius and a conic constant may be different.

In summary, the transmittance control member (100) comprises a base part (110) disposed so as to face the first surface (11) of the body (10), a first curved surface part (121) convexly arranged from the base part (110) toward the second surface (12) of the body, and a second curved surface part (131) convexly arranged in the first curved surface part (121) toward the second surface (12) of the body, provided that at least one of a radius and a conic constant is different from that of the first curved surface part (121).

In addition, the first curved surface part (121) and the second curved surface part (131) are each provided with a reflective layer (150, 160) on each outer circumferential surface. For convenience of explanation, the reflective layer (150) provided on the surface of the first curved surface part (121) may be referred to as a first reflective layer (150) and the reflective layer (160) provided on the surface of the second curved surface part (131) may be referred to as a second reflective layer (160). The reflective layers (150, 160) may be formed of a material having a predetermined reflectance, in particular, a material having an excellent reflectance, for example, a metallic material such as aluminum. Also, the first reflective layer (150) may be provided to surround the entire region of the first curved surface part (121) or may be provided to surround some regions of the first curved surface part (121). Furthermore, the second reflective layer (160) may be provided to surround the entire region of the second curved surface part (131) or may be provided to surround some regions of the second curved surface part (131).

As described above, the transmittance control member (100) comprises a connection (170) connecting the first curved surface part (121) and the second curved surface part (131) to have a step difference. At this time, the connection (170) is provided with no reflective layer. Accordingly, the light traveling inside the transmittance control member (100) can be emitted to the outside through the connection (170), and external light can be incident into the transmittance control member (100) through the connection (170).

Particularly, the first curved surface part (121) further protrudes toward the second surface (12) of the body (10) than the second curved surface part (131).

In this structure, referring to FIG. 3, at least a part of the light (L) passing through the base part (110) and reflected from the first curved surface part (121) passes through the connection (170) and travels toward the second curved surface part (131). Thereafter, the light is reflected from the second curved surface part (131) and travels toward the second surface (12) of the body (10).

Specifically, the light incident on the first surface (11) of the body (10) passes through the base part (110) of the transmittance control member (100) and is reflected from the first curved surface part (121) toward the second curved surface part (131), and then is reflected from the second curved surface part (131) toward the second surface (12) of the body (10) to pass through the second surface (12). The transmittance in this direction is referred to as the forward transmittance.

Referring to FIG. 4, at least a part of the light (L) passing through the second surface (12) of the body (10) and reflected from the second curved surface part (131) passes through the connection (170) and travels toward the first curved surface part (121). Thereafter, the light is reflected from the first curved surface part (121) and travels toward the first surface (11) of the body (10).

Specifically, the light incident on the second surface (12) of the body (10) passes through the second curved surface part (131) of the transmittance control member (100) and is reflected from the second curved surface part (131) toward the first curved surface part (121), and then is reflected from the first curved surface part (121) toward the first surface (11) of the body to pass through the first surface (11). The transmittance in this direction is referred to as the reverse transmittance.

Also, the second curved surface part (131) may be located in a central region of the first curved surface part (121) and the first curved surface part (121) may be symmetrical on the basis of the second curved surface part (131).

On the other hand, the base part (110) may be formed as a flat surface and the transmittance control member (100)

may be disposed on the body (10) such that the base part (110) is parallel to the first surface (11) of the body (10).

At this time, the first curved surface part (121) may have a reflective area larger than the reflective area of the second curved surface part (131). Thus, depending on the difference in the reflective area, the forward transmittance may have a difference from the reverse transmittance.

Specifically, the differences between the forward transmittance and the reverse transmittance according to the differences in the reflective area are shown in Table 1 below. In the following, the area ratio represents "reflective area of the second curved surface part: reflective area of the first curved surface part."

TABLE 1

| Area Ratio | Forward Transmittance | Reverse Transmittance |
|---|---|---|
| 1:9 | 81% | 18% |
| 2:8 | 73% | 27% |
| 3:7 | 64% | 31% |
| 4:6 | 55% | 32% |
| 6:4 | 37% | 31% |
| 8:2 | 18% | 25% |

Referring to FIG. 5, when the area ratio is 1:9, the forward transmittance is larger than the reverse transmittance within a predetermined incident angle range. When the maximum incident angle is 0°, it means that light is incident on the first surface vertically. In addition, the difference between the forward transmittance and the reverse transmittance varies depending on the incident angle.

Also, in the transmittance control member (100), the base part (110), the first curved surface part (121) and the second curved surface part (131) are formed of a resin material and the reflective layers (150, 160) are formed of a metallic material. Furthermore, the body (10) and the transmittance control member (100) may be formed of the same resin material.

On the other hand, the first curved surface part (121) may be further provided with an absorbing layer for absorbing light at least in some regions. For example, the absorbing layer may be provided in a region adjacent to the connection (170). The absorbing layer may be formed of a colloidal suspension, a metal or a metal oxide, having excellent absorptivity. Accordingly, the first curved surface part (121) may be provided with the first reflective layer (150), and at least a part thereof may be provided with the absorbing layer. For example, the absorbing layer is formed on the first reflective layer (150), where the region arranged by the absorbing layer may have a multi-layer structure.

Furthermore, the second surface (12) of the body (10) may be provided with at least a part of the absorbing layer. The absorbing layer may be formed in the entire region or some regions of the second surface depending on the required optical characteristics (transmittance, etc.).

In summary, the asymmetric transmission film (1) related to one embodiment of the present invention can control the forward/reverse transmittance and the difference thereof by changing the curved surface characteristics (radius, conic constant, etc.) of the first curved surface part (121) and the second curved surface part (131), or changing the ratio of the reflective area, and can be applied variously.

For example, FIGS. 6 and 7 are calculation results showing illuminance changes by the asymmetric transmission film. In FIG. 6, the transmittance control member is an 1D structure, wherein the first curved surface part (121) and the second curved surface part (131) form curved surfaces in one direction of a plane perpendicular to the light transmission direction, and in FIG. 7, the transmittance control member is a 2D structure, wherein the first curved surface part (121) and the second curved surface part (131) form curved surfaces in both orthogonal directions of a plane perpendicular to the light transmission direction.

Referring to FIG. 6, (a) shows incidence illuminance and (b) shows outgoing illuminance, where it can be confirmed that the outgoing illuminance increases 9 times or more as compared with the incidence illuminance. Accordingly, the asymmetric transmission film according to the present invention can be used as a line beam array generator.

Referring to FIG. 7, (a) shows incidence illuminance and (b) shows outgoing illuminance, where it can be confirmed that the outgoing illuminance increases 80 times or more as compared with the incidence illuminance. Accordingly, the asymmetric transmission film according to the present invention can be used as a beam spot array generator.

Besides, the asymmetric transmission film can be utilized as a projector, a magic mirror, an angle filter, and the like.

The preferred embodiments of the present invention as described above are disclosed for exemplary purpose, where those skilled in the art having ordinary knowledge for the present invention can make various corrections, modifications and additions within idea and scope of the present invention, and such a correction, modification and addition should be considered as falling within the scope of the following claims.

INDUSTRIAL APPLICABILITY

In the asymmetric transmission film related to the present invention, the bidirectional transmittance can have asymmetry at various wavelengths and various incident angles, and particularly, the bidirectional transmittance can have asymmetry regardless of the polarization of incident light.

The invention claimed is:

1. An asymmetric transmission film comprising:
   a body having a first surface and a second surface opposite to the first surface; and
   a transmittance control member disposed in the body such that a forward transmittance of light passing in a direction from the first surface toward the second surface and a reverse transmittance of light passing in a direction from the second surface toward the first surface are different from each other,
   wherein the transmittance control member comprises a base part disposed so as to face the first surface of the body, a first curved surface part convexly arranged from the base part toward the second surface of the body, and a second curved surface part convexly arranged in the first curved surface part toward the second surface of the body,
   wherein at least one of:
      a radius of the second curved surface part is different from a radius of the first curved surface part, or
      a conic constant of the second curved surface part is different from a conic constant of the first curved surface part, and
   wherein a reflective layer is provided on an outer circumferential surface of each of the first curved surface part and the second curved surface part.

2. The asymmetric transmission film according to claim 1, wherein the transmittance control member comprises a connection connecting the first curved surface part and the second curved surface part to have a step difference, and no reflective layer is provided on a surface of the connection.

3. The asymmetric transmission film according to claim 2, wherein the first curved surface part protrudes farther toward the second surface of the body than the second curved surface part protrudes toward the second surface of the body.

4. The asymmetric transmission film according to claim 3, wherein the second curved surface part is located in a central region of the first curved surface part.

5. The asymmetric transmission film according to claim 4, wherein the first curved surface part is symmetrical relative to the second curved surface part.

6. The asymmetric transmission film according to claim 3, wherein the transmittance control member is configured such that at least a portion of light passing through the base part and reflected from the first curved surface part passes through the connection and travels toward the second curved surface part.

7. The asymmetric transmission film according to claim 3, wherein the transmittance control member is configured such that at least a portion of light passing through the second surface of the body and reflected from the second curved surface part passes through the connection and travels toward the first curved surface part.

8. The asymmetric transmission film according to claim 2, wherein the transmittance control member is configured such that light incident on the first surface of the body passes through the base part of the transmittance control member and is reflected from the first curved surface part toward the second curved surface part, and then is reflected from the second curved surface part toward the second surface of the body to pass through the second surface.

9. The asymmetric transmission film according to claim 2, wherein the transmittance control member is configured such that light incident on the second surface of the body passes through the second curved surface part of the transmittance control member and is reflected from the second curved surface part toward the first curved surface part, and then is reflected from the first curved surface part toward the first surface of the body to pass through the first surface.

10. The asymmetric transmission film according to claim 2, wherein the connection is formed as a flat surface.

11. The asymmetric transmission film according to claim 1, wherein each of the first curved surface part and the second curved surface part is formed as an aspherical surface.

12. The asymmetric transmission film according to claim 1, wherein the base part is formed as a flat surface and the transmittance control member is disposed so that the base part is parallel to the first surface of the body.

13. The asymmetric transmission film according to claim 1, wherein a reflective area of the first curved surface part has a reflective area is greater than a reflective area of the second curved surface part.

14. The asymmetric transmission film according to claim 13, wherein the forward transmittance is larger than the reverse transmittance within a predetermined incident angle range.

15. The asymmetric transmission film according to claim 13, wherein a difference between the forward transmittance and the reverse transmittance varies depending on an incident angle.

16. The asymmetric transmission film according to claim 1, wherein in the transmittance control member, the base part, the first curved surface part and the second curved surface part are formed of a resin material, and the reflective layer is formed of a metallic material.

17. The asymmetric transmission film according to claim 16, wherein the body and the transmittance control member are formed of the same resin material.

18. The asymmetric transmission film according to claim 1, wherein the first curved surface part is provided with an absorbing layer.

19. The asymmetric transmission film according to claim 18, wherein the absorbing layer is formed of a colloidal suspension, a metal or a metal oxide.

20. The asymmetric transmission film according to claim 1, wherein at least a part of the second surface of the body is provided with an absorbing layer.

* * * * *